Jan. 16, 1923.
L. B. WHIPPLE.
DYNAMIC BALANCING MACHINE.
FILED FEB. 21, 1919.
1,442,316.
3 SHEETS—SHEET 3.
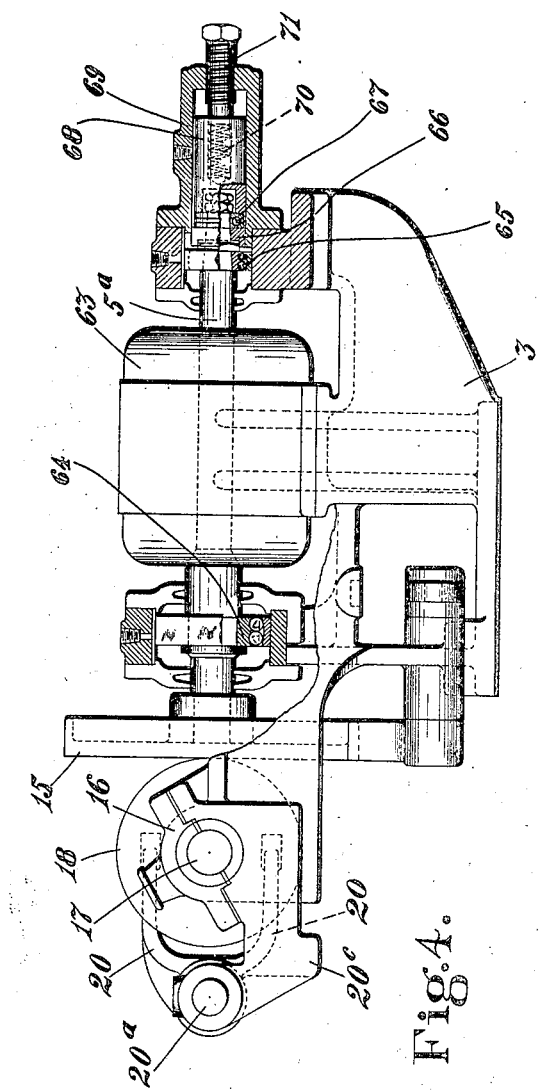
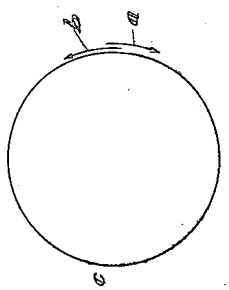
INVENTOR
Leland B. Whipple
By his Attorney
Nelson N. Howard Patented Jan. 16, 1923.

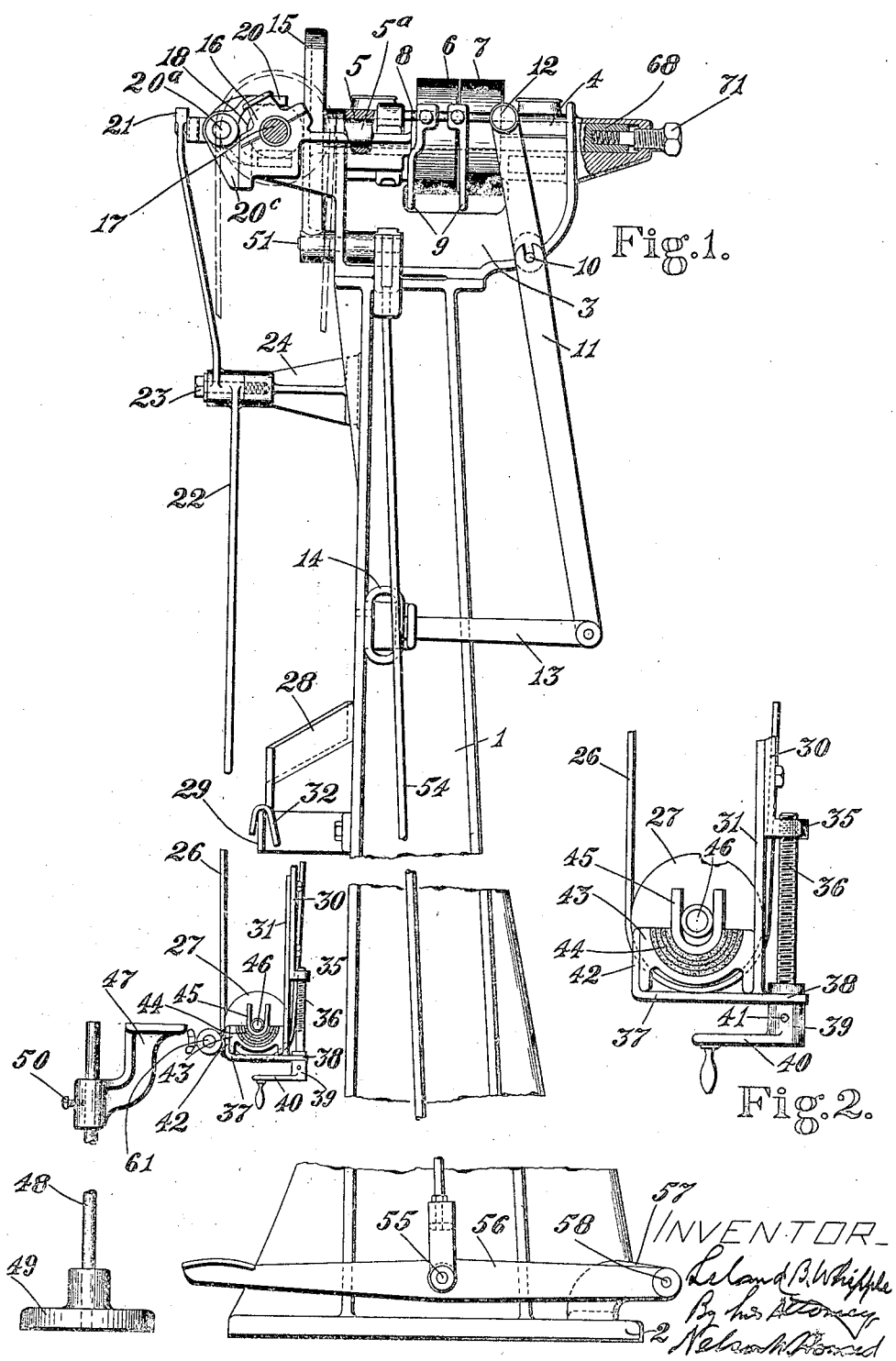

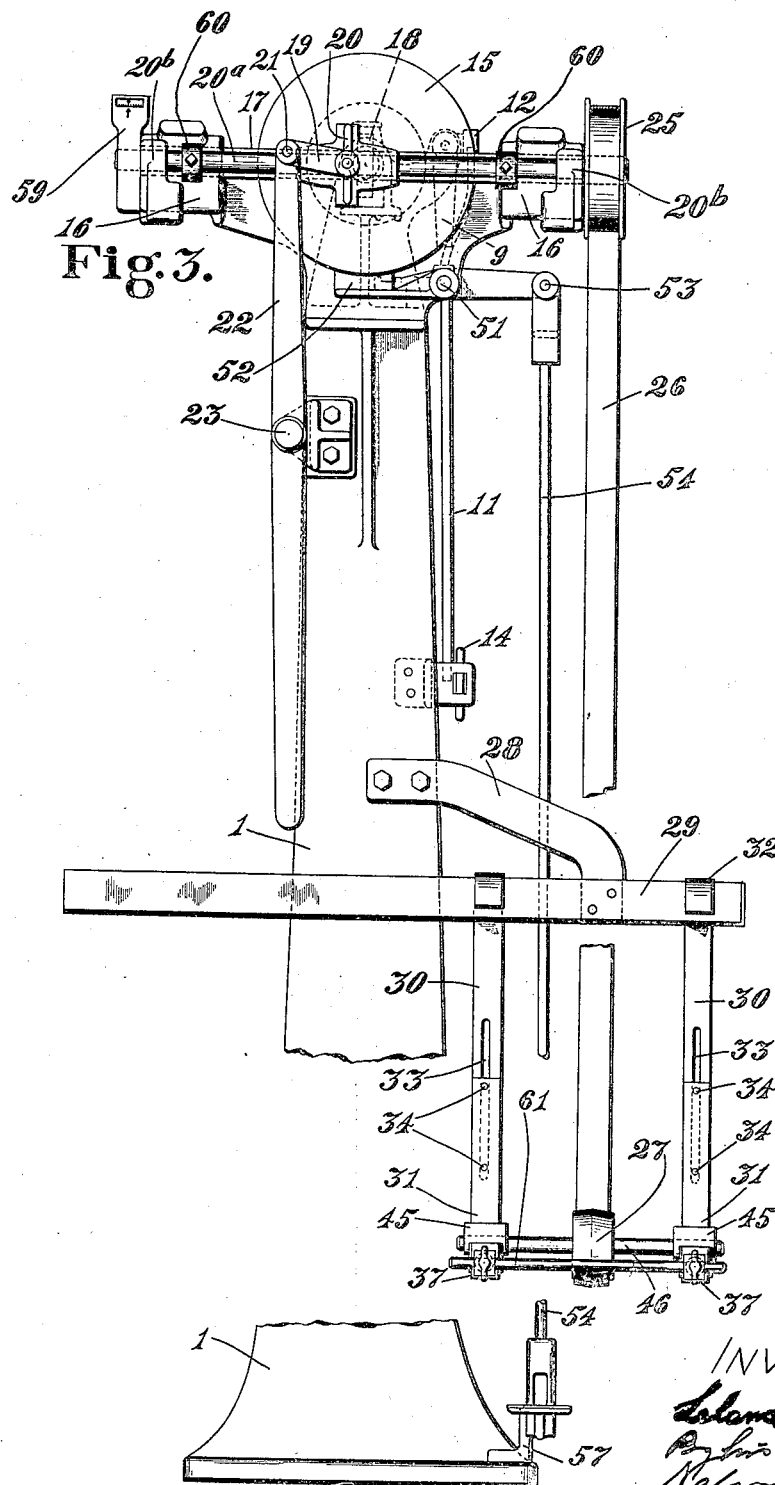

1,442,316

UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

DYNAMIC BALANCING MACHINE.

Application filed February 21, 1919. Serial No. 278,431.

*To all whom it may concern:*

Be it known that I, LELAND B. WHIPPLE, a citizen of the United States, residing at Rochester, in the county of Monroe and State of New York, have invented certain Improvements in Dynamic Balancing Machines, of which the following description, in connection with the accompanying drawings, is a specification, like reference characters on the drawings indicating like parts in the several figures.

This invention relates to balancing machines for determining and adjusting the balance of rotatable bodies.

Heretofore it has been the common practice to determine the balance of a rotatable body by supporting it on parallel horizontal ways by means of a shaft or arbor in which condition the heavier portion of the body will gravitate to the bottom of the system. This method will determine what is known as the "static balance," but when correction is made for any unbalanced condition observable by this method, it does not insure perfect dynamic balance during rotation since a heavy spot in one plane perpendicular to the axis of rotation may statically balance another heavy spot in another plane perpendicular to the axis of rotation and thus, when the body is rotated, form a disturbing couple with an axis different from the axis of rotation. It has, therefore, been proposed to determine the balance of rotatable bodies by the dynamic method whereby the body is rotated at speed, first in one and then the other direction and marks are made on the body or arbor from which may be ascertained that portion of the revolving mass having the preponderating weight and correction made by adding or subtracting weight at the proper points. The markings are placed on the body or its supporting arbor by holding a pencil, chalk, or other marking tool in fixed position to just touch the adjacent revolving surface should it move towards the marker due to an unbalanced condition. The markings will appear on the heavy side of the body when it is revolved below the "critical speed" and will appear on the light side of the body when it is rotated above the critical speed since, when rotated with sufficient rapidity, each element of the body along the axis tends to rotate about its own center of mass. In either event, however, the marks extend some distance about the body and are displaced from the exact heavy or light spot, respectively, the displacement depending upon the direction of rotation. By revolving the body at like speed, first in one and then in the other direction, the true heavy or light spot will be found midway between the centers of the two marks and correction may be readily made by adding or subtracting weight.

Since the markings are due to the displacement or bodily movement of the system as it seeks to find its own center of rotation, as distinguished from its center of form, it follows that the object to be balanced should be unrestrained from such bodily movement as may be dictated by its unbalanced condition. Where the body or object to be balanced has been driven by a belt, it has usually been supported by a shaft or arbor running in bearings against which the shaft or arbor has been drawn by the pull of the belt, thus restraining free balancing movement of the body or object. An important object of the present invention is to eliminate this restraint and so support the body or object that it may more freely respond to movements induced by any unbalanced condition. This feature of the invention is carried into effect by driving the object or body to be balanced by a belt and providing movable bearings for the shaft or arbor that are open in the direction of belt pull, the effect being that instead of binding or pulling the shaft or arbor against fixed bearings, the shaft or arbor is permitted free movement in the direction of belt pull.

The light spot will not be exactly indicated by a single mark, owing to effect of the various causes in slightly affecting the tendency to rotate about the center of mass, and this difficulty is eliminated by marking the body twice while rotating it in opposite directions, as already stated. Another important feature of the invention is, therefore, the advantageous association with the open bearings of a forward and reverse drive for the belt, which is preferably constituted as a reversible friction drive formed of friction disks.

A further important feature of the invention consists in yieldable U-bearings for the shaft or arbor opening in the direction of belt pull and adjustable in the same direction, so that when the body or object to be balanced is associated with the driving belt it may be substantially wholly supported, thus eliminating largely the effect of the bearings in masking the self-balancing tendency of the object. The object thus approximates the condition of a top being thrown through the air and set in rotation by its string. Other novel features of the invention and combinations of parts in addition to the above will be hereinafter described in connection with the accompanying drawings which illustrate one good practical form thereof.

In the drawings:

Fig. 1 is a side elevation of a balancing machine embodying the present invention, some of the parts being broken away;

Fig. 2 is an enlarged detail in side elevation;

Fig. 3 is a front view of the machine shown by Fig. 1, some of the parts being broken away and others omitted for clearness;

Fig. 4 is an enlarged side elevation of the top or head of the machine with some of the parts shown in section, and illustrating a modified form of driving means;

Fig. 5 is a diagrammatic view indicating the markings where the body or object is rotated above the critical speed.

The machine frame may be of any suitable character to properly support the operating parts, and in the present instance of the invention, comprises a column 1 rising from a base 2 and surmounted by a head or top 3. Where the driving belt, to be hereinafter more fully described, is subjected to an overhead drive, as in the illustrated form of the invention, the column 1 is made of suitable height to give to the driving belt a long run between the driving means and the body or object to be balanced.

In the present instance the head 3 is provided with bearings 4, 5 in which is mounted a driving shaft 5ª carrying the fast and loose pulleys 6 and 7, which may be driven by belt connection from any suitable source of power. Adjacent the fast and loose pulleys 6 and 7, there is a sliding member or rod 8 carrying the forks 9 between which the belt may run and by which it may be shifted from the fast or loose pulley, as circumstances dictate. Pivotally mounted on the head at 10 is a shifting lever 11, the upper end of which at 12 is connected to the sliding rod 8 and the lower end to an arm 13 having a hand pull 14 in convenient position to be grasped by the attendant.

Secured to the driving shaft is the friction disk 15, and mounted in suitable bearings 16 is the counter or transverse shaft 17. On the shaft 17 is mounted a fibrous friction wheel 18 adapted to engage the face of the friction disk 15 and be driven thereby. The fibrous friction wheel 18 is splined to the counter or transverse shaft 17 so as to rotate therewith, but capable of longitudinal movement relative thereto, the construction being such that the friction wheel may be moved to either side of the center of the friction disk 15 and cause rotation of the counter or transverse shaft 17 in either direction. Movement may be imparted to the friction wheel longitudinally of its shaft by any appropriate means, and in the present instance a link 19 has one end thereof pivoted to a yoke 20 which embraces an appropriate circular groove in the hub of the friction wheel and slides upon the transverse rod 20ª which may be appropriately supported in bearings 20ᵇ sustained by brackets 20ᶜ projecting from the head of the machine. The link 19 is connected at 21 with an operating lever 22 pivoted at 23 to a bracket 24 extending from the column 1, the lower end of the lever preferably extending downward into convenient position for manipulation by the attendant, the construction being such that by manipulating the lever 22 the attendant may move the friction wheel longitudinally of its shaft 17 to either side of the center of the friction disk and thereby cause rotation of the shaft 17 in either direction. Mounted on the shaft 17 is the belt pulley 25 over which runs the belt 26, which constitutes a driving belt for the body or object to be balanced which is shown as a pulley 27.

The present invention contemplates that the body to be balanced, in the present instance the pulley 27, shall be unrestrained from bodily movement by the driving belt or bearings and to this end the body or pulley 27 is mounted upon a shaft or arbor which, when the system is run at speed, may rest in bearings which are open in the direction of belt pull. To further permit unrestrained movement of the system to be balanced while being run at speed, the bearings are made yieldable in a direction at an angle to the pull of the belt; a good practical form of such construction will now be described.

Secured to and projecting from the column 1 is a bracket 28 to which is secured the horizontal hanger support 29. The hangers for the open bearings may be variously contrived but in the present instance of the invention consist of the adjustable members 30 and 31, the upper members whereof are formed with open hook portions 32 which hang upon the hanger support 29 for free swinging movement. In the present instance this freedom for swinging movement is secured by rounding the hooks 32 as indicated in Fig. 1. The members 30 and 31 of the hangers may be adjustably connected by any siutable means. In the present instance the two members are connected for movement longitudinally thereof by slot and pin connections, the slot 33 being preferably formed in the member 30 and the pins 34 in the member 31, although, of course, this is not indispensable. The lower end portions of the members 30 are each provided with a lug 35, Fig. 1, which is threaded to receive the adjusting screw 36. The member 31 of each of the hangers is provided at its lower end with a bearing support 37 which is extended to one side as at 38, to engage a suitable groove in the hub portion 39 of a hand piece or crank 40 secured by a pin 41 to the adjusting screw 36, the construction being such that by manipulation of the hand piece or crank handle 40, the members 30 and 31 of the hangers may be properly adjusted relatively in a longitudinal direction.

The bearing supports 37 may be variously contrived, but in the present instance they each have an upturned portion 42, Figs. 1 and 2, between which and the main portion of the lower member 31 of the hanger is seated the yieldable open bearing for the shaft or arbor by which the body to be balanced is engaged. This yieldable bearing may be variously contrived, but in the present instance it is formed by the seat 43 containing yielding material 44 in which is seated the spindle or arbor bearing 45 which is open in the direction of the belt pull.

Where the body to be balanced consists of a pulley or like rotatable element, it is conveniently secured temporarily upon an arbor 46, the ends of which are adapted to be received by the open yieldable bearings, and the driving belt is passed downwardly about the body or pulley 27 and then driven, preferably at a speed approximately corresponding to that to which the body or pulley is subjected in use, first in one and then in the opposite direction, such reverse rotative movement being readily imparted under manual control of the lever 22.

The marker, such as a pencil or other indicating means, is supported in position to meet the arbor 46 as the latter moves under the rotative tendency of the unbalanced body to seek its true axis of rotation about its center of mass. In the present instance the marker support consists of a rest 47, Fig. 1, which may be conveniently sustained upon a spindle 48 rising from a pedestal 49 and may be secured in appropriate position by means of a set screw 50.

When the parts are in a condition of rest, the pulley 27 mounted upon its arbor 46 is placed in the lower bight of the belt 26, at which time the belt wholly supports the system with the arbor 46 some distance above the lower surface of the open U-bearings 45, substantially as indicated in Fig. 2. When the belt is driven and consequently stretched, the system, comprising the arbor and its pulley 27, gradually settles into the open U-bearings but is still free to rise therein under any disturbing influence. At this time, that is, when the pulley and arbor are being rotated at speed preferably above the "critical speed," the flexible U-bearings will move under the permissive control of the hangers and at such time a marker presented to the arbor will indicate on the arbor, as represented in enlarged view, Fig. 5, a mark as at $a$, Fig. 5, when the system is rotated in one direction, and will indicate another mark as at $b$ when the system is rotated in an opposite direction, such markings being substantially opposite the heavy portion of the pulley. The heavy spot which is to be balanced will be found directly opposite a point half-way between the extremities of the two marks $a$ and $b$ as at $c$ and by a cut-and-try method a proper balancing of the pulley may be secured.

Mounted upon the head of the machine, as at 51, Figs. 1 and 3, is a brake lever, carrying a brake 52 which may, under the control of a treadle, gradually bring the drive shaft to rest by acting upon the peripheral portion of the friction disk 15. In the present instance the brake lever 51 is connected at 53 to a treadle rod 54 which, at its lower end, is connected at 55 to a treadle 56 pivoted to a bracket 57 as at 58.

By reason of the frictional disk drive, the attendant is enabled to readily change the direction of rotation of the body to be balanced by manipulation of the lever 22, and in order that the rotation of the body in one direction may correspond in velocity to its rotation in the opposite direction, a speed indicator may be connected to the transverse or counter shaft 17, as indicated at 59. Adjustable stops 60 are also provided to limit the movement of the wheel 18, in each direction, for the same purpose. A rod 61 may extend between the bearing supports, if desired.

In Fig. 4 is shown a modified form of drive for the disk 15, comprising a motor 63 whose rotor is mounted on the shaft $5^a$. This construction eliminates all vibration resulting from the operation of a belt upon the pulleys 6—7.

In order that the friction wheel and the friction disk may be held in suitable frictional driving relation, an adjustable thrust bearing is provided. This may be variously constructed and a good practical form is illustrated in detail in Fig. 4. The shaft $5^a$ is supported in ball bearings 64, 65. A washer 66 rests against the rotating member of the bearing 65 and is engaged on its outer side by a ball thrust bearing 67. The outer stationary member of the bearing 67 is engaged by a sleeve 68 which slides in the housing 69. It is counterbored at 70 and contains a spring against which the screw 71 is set up. The pressure between the disk 15 and wheel 18 is thus adjustable to any desired degree.

Having described my invention, what I claim as new and desire to secure by Letters Patent of the United States is:—

1. In a balancing machine, the combination of an arbor adapted to carry the body to be balanced, a belt passing about the arbor, yieldable U-bearings for the arbor that are open in the direction of belt pull and means for driving the belt.

2. In a machine of the class described, the combination of a belt for driving the body to be balanced, bearings for the body that are open in the direction of belt pull, and movable under the balancing stress imparted by the body, driving means for the belt, and means operable at will to cause the driving means to drive the belt in either direction.

3. In a balancing machine, the combination of a belt leading under the body to be balanced for driving the same, bearings for the body that open upward in the direction of belt pull, means for yieldingly supporting the bearings, and friction disks for selectively operating the belt in either direction.

4. In a machine of the class described, the combination of an arbor to which the body to be balanced may be secured, a belt for driving the arbor, means for selectively operating the belt in either direction, bearings for the arbor that are open in the direction of belt pull, and means for supporting the bearings for yielding movement in a direction at an angle to the opening of the bearings.

5. In a balancing machine, the combination of the frame, a driving shaft carrying a friction disk, a driven shaft having a friction wheel movable relatively to the friction disk to effect movement of the driven shaft in either direction, a belt operated from the driven shaft and passing about the object to be balanced, bearings for the body that open in the direction of belt pull, and means for moving the friction wheel relatively to the friction disk to effect movement of the belt in either direction.

6. A balancing machine comprising, in combination, a driving shaft and a driven shaft, friction operated motion transmitting connections between said shafts, means for selectively shifting the relation of the connections to cause the driven shaft to be rotated in either direction, an arbor adapted to carry the object to be balanced, a belt operated by the driven shaft and passing about the arbor, and bearings for the arbor that are open in the direction of belt pull.

7. A balancing machine comprising, in combination, a driving shaft and a driven shaft, friction operated motion transmitting connections between said shafts, means for selectively shifting the relation of the connections to cause the driven shaft to be rotated in either direction, a belt operated by the driven shaft and passing about the object to be balanced, yielding bearings for the object, and means for adjusting the bearings to permit the belt to support a substantial part of the weight of the object when the belt is stretched under running conditions.

8. A balancing machine comprising in combination, a driving shaft and a driven shaft, friction operated motion transmitting connections between said shafts, means for selectively shifting the relation of the connections to cause the driven shaft to be rotated in either direction, an arbor adapted to carry the object to be balanced, a belt operated by the driven shaft and passing about the arbor, bearings for the arbor, swinging supports for the bearings, and means for adjusting the bearings that the belt may support the arbor and its load when the parts are at rest and the arbor may rest in the bearings when the belt is stretched by being driven at speed.

9. In a machine of the class described, the combination of an arbor for holding the body to be balanced, a belt for driving the arbor, bearings for the arbor that are open in the direction of belt pull, means for driving the belt, and means for adjusting the open bearings that the arbor and its load may be substantially supported by the belt when the parts are driven at speed.

10. In a machine of the class described, the combination of an arbor for holding the body to be balanced, a belt leading downward about the arbor, bearings for the arbor that are open upward in the direction of belt pull, means for adjusting the bearings in the direction of the opening of the bearings to permit the belt to wholly support the arbor and its load when the parts are in a condition of rest, and means for selectively operating the belt in either direction.

11. In a balancing machine, the combination of an arbor adapted to carry the body to be balanced, a belt leading downward about the arbor, yieldable U-bearings that open upward in the direction of belt pull, relatively movable friction disks for selectively operating the belt in either direction, and swinging supports for the flexible U-bearings.

12. In a balancing machine, the combination of an arbor adapted to carry the body to be balanced, a belt leading downward about the arbor, yieldable U-bearings that open upward in the direction of belt pull, relatively movable friction disks for selectively operating the belt in either direction, swinging supports for the flexible U-bearings, and means for adjusting the flexible U-bearings on the swinging supports.

13. In a machine of the class described, the combination of the frame, a driving shaft supported by the frame and carrying a friction disk, a driven shaft, a friction wheel mounted on the driven shaft for movement longitudinally thereof and engaging the friction disk, a belt leading from the driven shaft downward about the body to be balanced, yieldable U-bearings for the body opening upward in the direction of belt pull, and manually controlled means for shifting the friction wheel on the driven shaft.

14. In a balancing machine, the combination of a balancing arbor adapted to carry the body to be balanced, a belt passing about the arbor, yieldable U-bearings for the arbor opening in the direction of belt pull, swinging hangers for the bearings, and means for adjusting the length of the hangers.

15. In a balancing machine, the combination of an overhead driven belt passing downward about the body to be balanced, bearings for the body that are open in an upward direction to permit free movement of the body in the direction of belt pull, and movable laterally responsive to an unbalanced condition of the body during rotation.

In testimony whereof I have signed my name to this specification.

LELAND B. WHIPPLE.